(12) United States Patent  
Woegerbauer et al.

(10) Patent No.: US 9,733,073 B2  
(45) Date of Patent: Aug. 15, 2017

(54) APPARATUS FOR DETERMINING THE ANGLE BETWEEN TWO PLANAR WORKPIECE SURFACES

(71) Applicant: KEBA AG, Linz (AT)

(72) Inventors: Andreas Woegerbauer, Linz (AT); Johann Woegerbauer, Linz (AT)

(73) Assignee: KEBA AG, Linz (AT)

( * ) Notice: Subject to any disclaimer, the term of this patent is extended or adjusted under 35 U.S.C. 154(b) by 0 days.

(21) Appl. No.: 15/321,834

(22) PCT Filed: Jun. 26, 2015

(86) PCT No.: PCT/AT2015/050162  
§ 371 (c)(1),  
(2) Date: Dec. 23, 2016

(87) PCT Pub. No.: WO2015/196230  
PCT Pub. Date: Dec. 30, 2015

(65) Prior Publication Data  
US 2017/0138724 A1    May 18, 2017

(30) Foreign Application Priority Data  
Jun. 27, 2014    (AT) ............................. A 50447/2014

(51) Int. Cl.  
*G01B 11/26*    (2006.01)  
*G01C 1/00*    (2006.01)  
(Continued)

(52) U.S. Cl.  
CPC .............. *G01B 11/26* (2013.01); *B21C 51/00* (2013.01); *B21D 5/02* (2013.01)

(58) Field of Classification Search  
CPC ................................. G01B 11/26; G01C 1/00  
(Continued)

(56) References Cited

U.S. PATENT DOCUMENTS 4,969,744 A * 11/1990 Ordell .................... G01B 11/26  
356/510  
5,027,434 A    6/1991 Brahms et al.

FOREIGN PATENT DOCUMENTS

DE    43 12 565 A1    10/1994  
EP    0 313 738 A2    5/1989  
(Continued)

OTHER PUBLICATIONS

English translation of Written Opinion of the International Searching Authority in PCT/AT2015/050162, Nov. 2, 2016.  
(Continued)

*Primary Examiner* — Roy M Punnoose  
(74) *Attorney, Agent, or Firm* — Collard & Roe, P.C.

(57) ABSTRACT

The invention relates to an apparatus for determining the angle ($\alpha$) between two planar workpiece surfaces (1, 2), comprising a laser transmitter (10) for a laser beam (9), a continuously rotating straightening rotor (3), which is arranged between the two workpiece surfaces (1, 2), is axially parallel to the vertex axis (5) of the angle ($\alpha$) and has an emission direction for the laser beam (9) that is perpendicular to the rotor axis (4), and comprising a receiving device (11) having a receiver for the laser beam (9) reflected on the workpiece surfaces (1, 2) in the emission direction, and an evaluation circuit (18) connected to the receiving device (11). In order to provide advantageous constructive conditions, it is proposed that the laser transmitter (10) comprises a monitor diode (16) and that the monitor diode (16) forms the receiver for the reflected laser beam (9).

4 Claims, 3 Drawing Sheets

(51) Int. Cl.
*B21D 5/02* (2006.01)
*B21C 51/00* (2006.01)

(58) Field of Classification Search
USPC .......................................................... 356/138
See application file for complete search history.

(56) References Cited

FOREIGN PATENT DOCUMENTS

| EP | 0 915 320 A1 | 5/1999 |
|----|--------------|--------|
| JP | S63-17405 U | 2/1988 |
| JP | H01-199104 A | 8/1989 |
| JP | 2624557 B | 6/1997 |
| JP | 2002-059217 A | 2/2002 |

OTHER PUBLICATIONS

International Search Report of PCT/AT2015/050162, mailed Oct. 15, 2015.

* cited by examiner

APPARATUS FOR DETERMINING THE ANGLE BETWEEN TWO PLANAR WORKPIECE SURFACES

CROSS REFERENCE TO RELATED APPLICATIONS

This application is the National Stage of PCT/AT2015/050162 filed on Jun. 26, 2015, which claims priority under 35 U.S.C. §119 of Austrian Application No. A 50447/2014 filed on Jun. 27, 2014, the disclosure of which is incorporated by reference. The international application under PCT article 21(2) was not published in English.

1. Field of the Invention

The invention relates to an apparatus for determining the angle between two planar workpiece surfaces, comprising a laser transmitter for a laser beam, a continuously rotating straightening rotor, which is arranged between the two workpiece surfaces, is axially parallel to the vertex axis of the angle and has an emission direction for the laser beam that is perpendicular to the rotor axis, and comprising a receiving device having a receiver for the laser beam reflected on the workpiece surfaces in the emission direction, and an evaluation circuit connected to the receiving device.

2. Description of the Prior Art

Different measuring devices are known for detecting the bending angle of sheets bent in folding presses, wherein the optical detection, which is usually carried out on the basis of a light section method, offers the advantage of freedom of wear and tear as compared to mechanical scanning of the surface of the sheet. In addition to the light section method, an optical measuring method is known (EP 0 915 320 A1) in which a laser transmitter is arranged on the exterior side of a limb of a sheet that is bent in a folding press, which laser transmitter is pivoted back and forth about an axis which is parallel to a vertex axis of the bending angle, namely about a middle position which is determined by a laser beam progression which is perpendicular to the limb surface of the sheet. Since the laser transmitter is symmetrically arranged between two receiver diodes, one of the two receiver diodes is supplied with the laser beam reflected on the limb surface during each outward pivoting of the laser transmitter from the middle position of the straightening rotor, so that the signal peaks of the receiver diodes, in conjunction with the associated rotational position of the straightening rotor and thus the laser transmitter in relation to a defined rotational reference position, determine the angle between the transmitted laser beam and a normal on the limb surface. Since this angle depends on the distance of the laser transmitter from the limb surface, the rotational angles of the laser transmitter associated with the signal peaks of both receiver diodes are detected for detecting the rotational angle of the middle position of the laser transmitter which is perpendicular to the limb surface, which rotational angle relates to the rotational reference position, so that the angle of the middle position, which is perpendicular to the limb surface, in relation to the rotational reference position is calculated by half the total of the two rotational angles of the receiver diodes and the angle between the limb surface and a reference surface determined by the rotational reference position can be derived therefrom. It is advantageous in this known optical detection of the angle of a workpiece surface relative to a reference surface that no scattered light but the laser beam reflected on the workpiece surface is used for determining the angle. The effort required for this purpose is disadvantageous, since a respective measuring device is required for each limb for measuring the angle between the two limbs of the sheet.

For partly avoiding these disadvantages it is finally known (JP 2002-59217 A) to provide a continuously revolving straightening rotor between the two flat workpiece surfaces, having a rotor axis parallel to the vertex axis of the angle between the two workpiece surfaces, so that a laser beam coaxial to the rotor axis is deflected radially to the rotor axis by a mirror of the straightening rotor inclined under 45° relative to the rotor axis when the deflected laser beam stands perpendicularly to the respective work piece surface. The respective angle between the two workpiece surfaces can be determined in an evaluation circuit via the respective rotational position of the drive motor of the straightening rotor. The constructive effort caused by the transmitter and receiving device is disadvantageous however, which constructive effort requires in the beam path between the laser transmitter and the straightening rotor a semi-transparent mirror for deflecting the reflected laser beam to the receiving device and thus requires special constructions of the bending die of folding presses in order to house the measuring apparatus.

SUMMARY OF THE INVENTION

The invention is thus based on the object of providing an apparatus for determining the angle between two planar workpiece surfaces in such a way that high-resolution angular detection can be ensured with comparatively simple constructive means.

On the basis of an apparatus of the kind mentioned above, this object is achieved by the invention in such a way that the laser transmitter comprises a monitor diode and that the monitor diode forms the receiver for the reflected laser beam.

The photo diodes that are used as monitor diodes in laser transmitters are usually used for the power control of the laser diodes because the photocurrent of said monitor diodes subjected to laser light depends on the emitted light power of the laser diode. When using the monitor diode as a receiver for the reflected laser beam, the monitor diode, when receiving a reflected laser beam, is not only subjected to the transmitted laser beam but also by the reflected laser beam, which is indicated in a considerable rise in the photocurrent, so that the rotational angle of the straightening rotor can be used as a measure for the inclination of a normal on the respective work piece surface during the occurrence of such a current peak of the monitor diode. A separate receiving device for the laser beam can thus be avoided and leads to a simple, compact construction, which is especially relevant in the constricted space in the region of the bending dies of folding presses.

The straightening rotor can accommodate the laser transmitted itself, which then revolves with the straightening rotor. Simpler constructive conditions are obtained for many applications however when the straightening rotor merely forms a flat reflection surface extending in the direction of the rotor axis for the laser beam emitted by a static laser transmitter, because in this case the laser transmitter and thus also the receiver for the reflected laser beam can be arranged independently of the straightening rotor.

The rotational angle of the straightening rotor is obtained in relation to a predetermined reference rotational position. For this purpose, the straightening rotor can be associated with a reference signal transducer which can be triggered dependent on the rotational position of the straightening rotor, is connected to the evaluation circuit and indicates said reference rotational position during each rotation of the straightening rotor. Although different reference signal transducers can be used, since it is merely necessary that the evaluation circuit is supplied in the reference rotational position of the straightening rotor with a reference signal representative of said rotational position, especially good constructive conditions are obtained when the laser beam itself triggers the reference signal transducer. A mirror can be used for this purpose which reflects the transmitted laser beam to the monitor diode, wherein a photocurrent peak which is considerably higher than the photocurrent occurs as a result of a laser beam reflected on the workpiece surface. If a straightening rotor is used with a mirror surface for deflecting the laser beam emitted by a static laser transmitter, said mirror surface can be used for generating the reference signal.

Especially simple evaluation criteria of the measurement data are obtained when the evaluation circuit comprises a clocked counter which can be triggered by the reference signal transducer, so that each rotation of the straightening rotor is sub-divided into counter steps, which each correspond to a rotational step of the straightening rotor and thus to an angular increment. The respective counter reading thus indicates the respective rotational angle of the straightening rotor which refers to the reference rotational position, wherein the difference of the counter readings for the rotational positions of the laser beams received in the direction of the emitted laser beams represents a direct measure for the angle to be measured between the two workpiece surfaces.

BRIEF DESCRIPTION OF THE DRAWINGS

The subject matter of the invention is shown in the drawings by way of example, wherein.

DESCRIPTION OF THE PREFERRED EMBODIMENT

Figure 1:
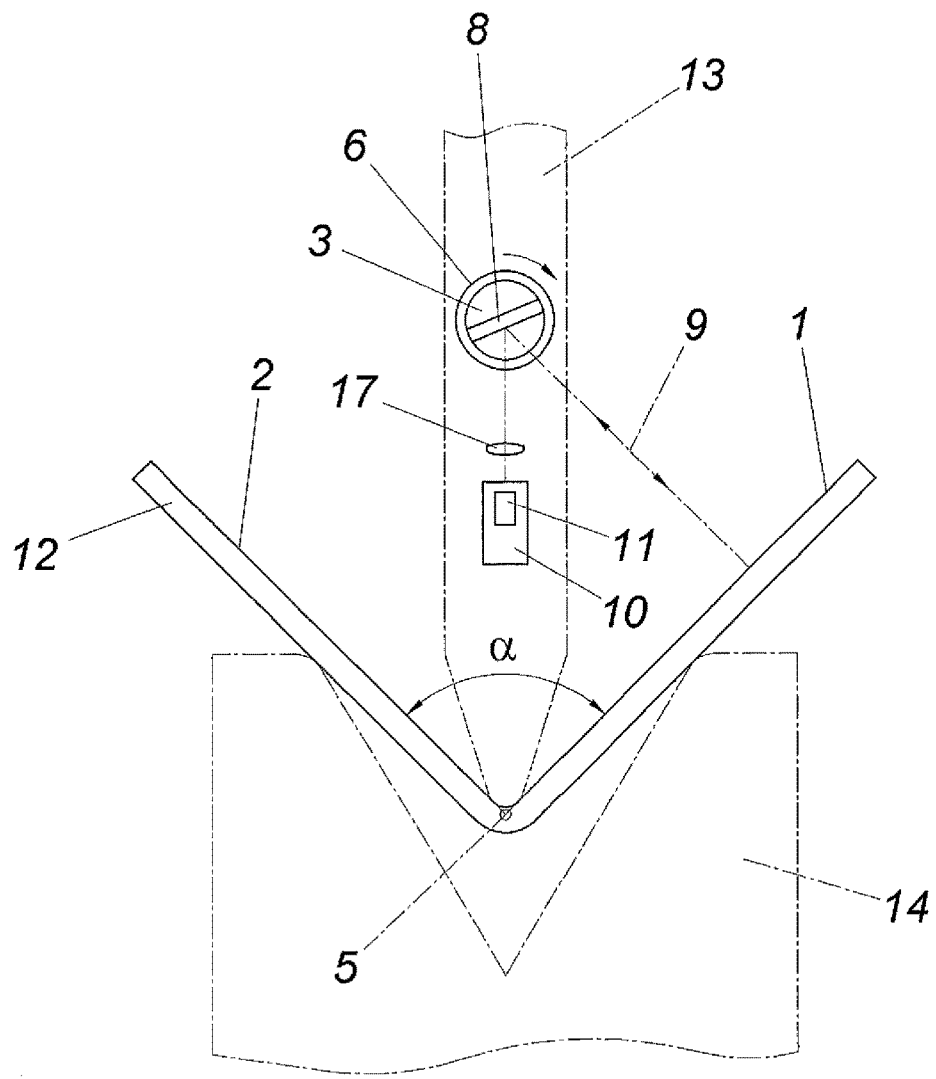
FIG. 1 shows an apparatus in accordance with the invention for determining the angle between two planar workpiece surfaces in a schematic front view.
Figure 2:
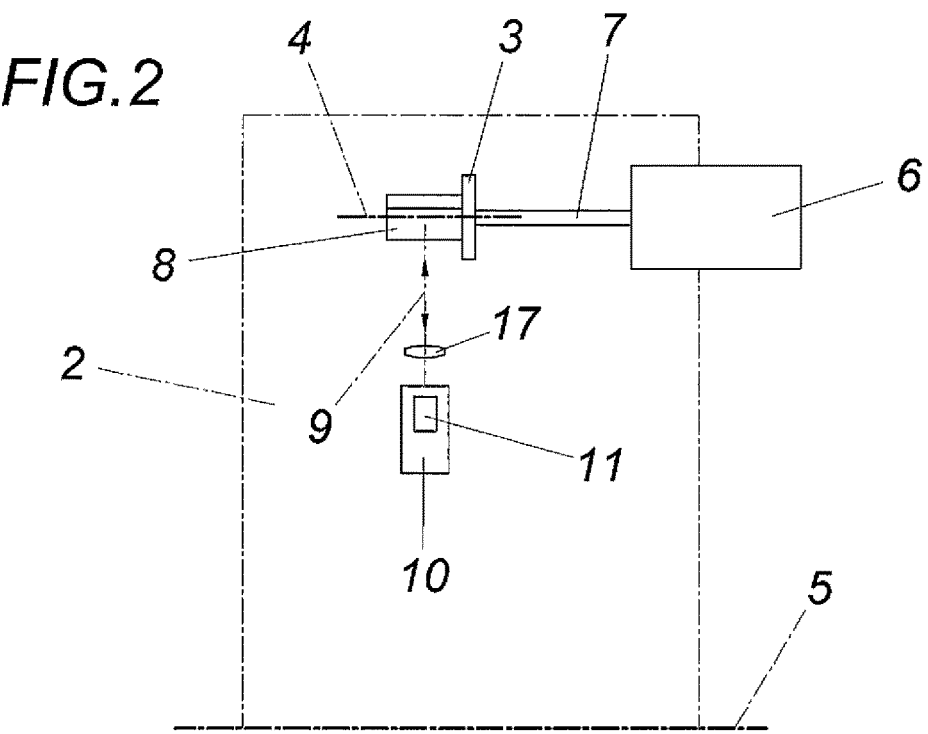
FIG. 2 shows this apparatus in a schematic side view.

As is shown especially in FIGS. 1 and 2, an apparatus in accordance with the invention for determining the angle α between two planar workpiece surfaces 1, 2 comprises a straightening rotor 3 whose axis 4 extends parallel to the vertex axis 5 of the angle α to be measured. In the illustrated embodiment, the straightening rotor 3 which can be driven by a motor 6 via a shaft 7 comprises a flat reflection surface 8 extending in the direction of the rotor axis 4 for a laser beam 9 which is emitted by a static laser transmitter 10 and impinges in a focused manner on the reflection surface 8 of the straightening rotor 3 in order to be mirrored on the reflection surface 8. The laser beam 9 emitted from the reflection surface 8 moves over the two workpiece surfaces 1, 2 along straight lines which are perpendicular to the vertex axis 5, intersect in the vertex axis 5 and enclose the angle α between themselves. The laser beam 9 which impinges on the workpiece surfaces 1 and is emitted by the reflection surface 8 of the straightening rotor 3 is reflected on the respective work piece surface 1, 2. Only the laser beam 9 which is reflected in the direction of the laser beam 9 impinging on the workpiece surfaces 1, 2 is evaluated for determining the angle via a receiving device 11, which in accordance with the invention is associated with laser transmitter 10 in order to provide especially simple constructive conditions.

As arises directly from FIG. 1, the laser beam 9 impinging on the workpiece surfaces 1, 2 is only reflected in the direction of the impinging laser beam 9 if the laser beam 9 extends perpendicularly to the workpiece surface 1, 2. The rotational position of the straightening rotor 3, when receiving the laser beam 9 reflected on the workpiece surfaces 1, 2, is therefore characteristic of the respective inclination of the workpiece surfaces 1, 2. Since the laser beams 9 which extend perpendicularly to the workpiece surfaces 1, 2 enclose the angle α to be measured between the workpiece surfaces 1, 2, the angle α between the workpiece surfaces 1, 2 is reproduced by the rotational positions of the straightening rotor 3 which correspond to the laser beams 9 which are perpendicular to the workpiece surfaces 1, 2, which can be evaluated in a simple manner by means of measurement.

FIG. 1 indicates the use of a measuring apparatus in accordance with the invention for determining the bending angle α between the limbs of a sheet 12, which is pressed by means of a die 13 into a bottom die 14 of a folding press. Although this application represents a preferred field of application, the invention is obviously not limited to the folding presses but can be used advantageously wherever it is necessary to measure the angle between two planar workpiece surfaces 1, 2 in a contactless manner.

Figure 4:
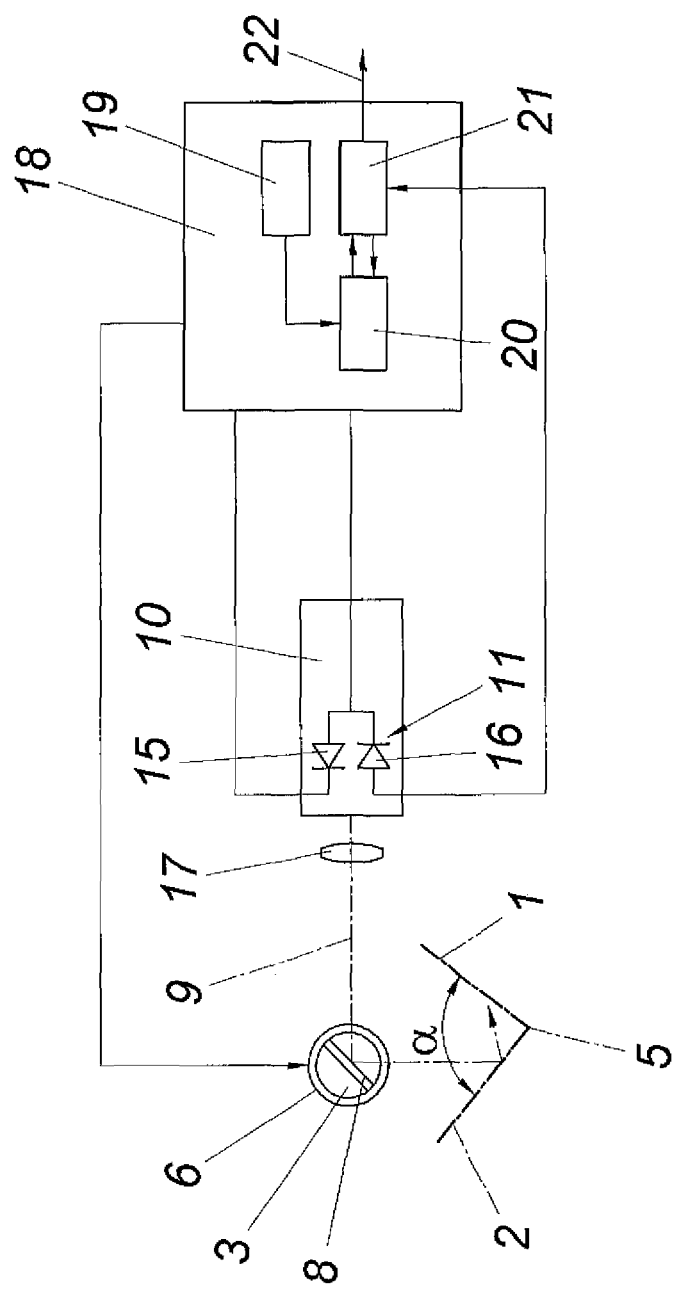
FIG. 4 shows a block diagram of an evaluation circuit for the apparatus in accordance with the invention.

Since the laser transmitter 10 comprises a monitor diode 16 in addition to the laser diode 15, said monitor diode 16 can be used as a receiver for the reflected laser beam 9, as indicated in FIG. 4. The laser diode 15 must be regarded substantially as a point source of light, so that the emitted laser light can be focused in a conventional manner by means of collimation optics 17 into a laser beam 9. Since the monitor diode 16 is used as a receiver for the reflected laser beam 9, the laser beam 9 which is reflected on the workpiece surfaces 1, 2 is additionally supplied to the monitor diode 16 so that a photocurrent peak occurs, which photocurrent peak caused by the application by the laser diode 15 exceeds the photocurrent and is representative of receiving the laser beam 9 which is reflected on the workpiece surfaces 1, 2. The angle α between the workpiece surfaces 1 and 2 can thus be indicated in a simple way from the associated rotational positions of the straightening rotor 3.

For this purpose, the rotational position of the straightening rotor 3 is to be placed in relation to a reference rotational position. A reference signal transducer is to be provided for this purpose, which can advantageously be impinged by the laser beam 9 itself. Since the reflected laser beam 9 is detected by the monitor diode 16, the monitor diode 16 can also be used as a reference signal transducer. In the rotational position of the straightening rotor 3, in which the reflection surface 8 stands perpendicularly to the laser beam 9 emitted by the laser transmitter 10, the laser beam 9 which is emitted by the laser transmitter 10 is reflected back directly from the reflection surface 8, which is a mirror, so that the monitor diode 16 is supplied with a considerably higher light power in comparison with the laser beams reflected on the workpiece surfaces 1, 2. The resulting photocurrent peak thus stands out distinctly from the photocurrent peaks relevant for the angular measurement. The reference rotational position which is determined by the rotational position with an orientation of the reflection surface 8 which is perpendicular to the receiving axis of the laser beam 9 is used as an initial rotational position for determining the angle.

Especially simple possibilities for evaluation are obtained if according to FIG. 4 the evaluation circuit 18, which triggers the motor 6 for the straightening rotor 3 and the laser transmitter 10, comprises a counter 20 clocked by an oscillator 19, which counter is respectively reset by the reference signal transducer. The output signal of the monitor diode 16 is supplied for this purpose to a computing unit 21 after respective amplification and conditioning, in which it is determined whether the signal received by the monitor diode 16 corresponds to the reference signal or a measurement signal on the basis of the received laser beam 9 which is reflected on the workpiece surfaces 1, 2. Following the occurrence of a reference signal, the counter 20 is newly started and counts the clocked increments during a rotation of the straightening rotor 3. Following the occurrence of a measurement signal, the respective counter reading is read out, which reading corresponds to the sum total of the increments counted up to this point, which as a result of a continuous rotation of the straightening rotor 3 can be placed on an equal level with angular increments. In order to detect the angle α between the two workpiece surfaces 1 and 2, it is therefore only necessary to form the difference of the rotational angle relating to the reference rotational position, which rotational angle is determined by the reception of the reflected laser beam 9.

In order to enable the precise determination of the angle α to a tenth of a degree, it is necessary to clock the counter at least 7200 times during a revolution of the straightening rotor 3. During a revolution of 360° the detection of tenths of degrees requires at least 3600 counter steps. Since the laser beam 9 reflected from a reflection surface 8 has twice the angular velocity in comparison with the angular velocity of the straightening rotor 3, it is necessary to double the number of the counter steps so that at least 7200 counter steps are required for this example. In the case of a greater number of counter steps, the $7200^{th}$ part of the number of counter steps corresponds to a tenth of a degree. For determining the angle α between the two workpiece surfaces 1, 2 it is therefore only necessary to form the difference between the counter step numbers for the rotational positions of the straightening rotor 3 in which the laser beam 9 extends perpendicularly to the workpiece surfaces 1, 2. The angular value can then be read out by the computing unit 21 directly via the output 22.

Figure 3:
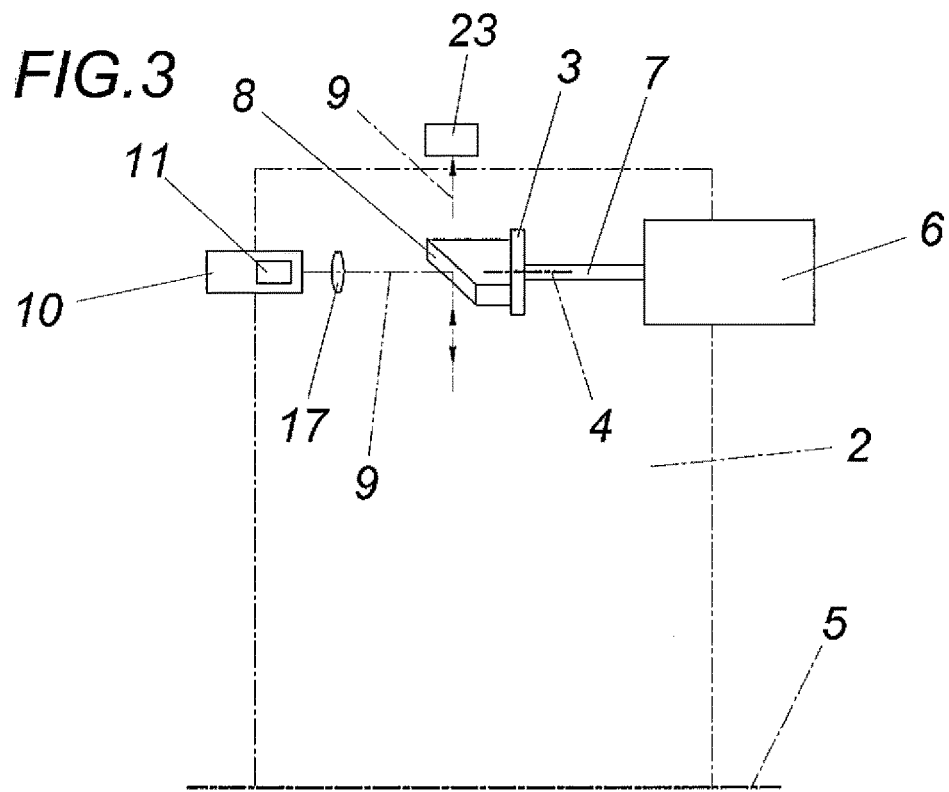
FIG. 3 shows an illustration of a constructional variant of an apparatus in accordance with the invention which corresponds to FIG. 2.

The embodiment according to FIG. 3 shows a prism can also be used as a reflection surface 8 of the straightening rotor 3, via which an additional deflection of the transmitted and received laser beam is possible, e.g. in order to provide a separate reference pulse generator 23 for a specific reference rotational position. Said reference pulse generator 23 is impinged by the laser beam 9 in the provided reference rotational position of the straightening rotor 3.

The invention claimed is:

1. An apparatus for determining the angle (α) between two planar workpiece surfaces (1,2), comprising a laser transmitter (10) for a laser beam (9), a continuously rotating straightening rotor (3), which is arranged between the two workpiece surfaces (1,2), is axially parallel to the vertex axis (5) of the angle (α) and has an emission direction for the laser beam (9) that is perpendicular to the rotor axis (4), and comprising a receiving device (11) having a receiver for the laser beam (9) reflected on the workpiece surfaces (1, 2) in the emission direction, and an evaluation circuit (18) connected to the receiving device (11), wherein the laser transmitter (10) comprises a monitor diode (16) and wherein the monitor diode (16) forms the receiver for the reflected laser beam (9).

2. An apparatus according to claim 1, wherein the straightening rotor (3) forms a flat reflection surface (8) which extends in the direction of the rotor axis (4) for the laser beam (9) emitted by the static laser transmitter (10).

3. An apparatus according to claim 1, wherein the straightening rotor (3) is associated with a reference signal transducer (23) which can be triggered depending on the rotational position of said straightening rotor (3) and is connected to the evaluation circuit (18).

4. An apparatus according to claim 3, wherein the evaluation circuit (18) comprises a clocked counter (20) which can be triggered by the reference signal transducer (23).

* * * * *